(No Model.) 2 Sheets—Sheet 2.
H. SCHNEIDER.
VELOCIPEDE.
No. 319,329. Patented June 2, 1885.
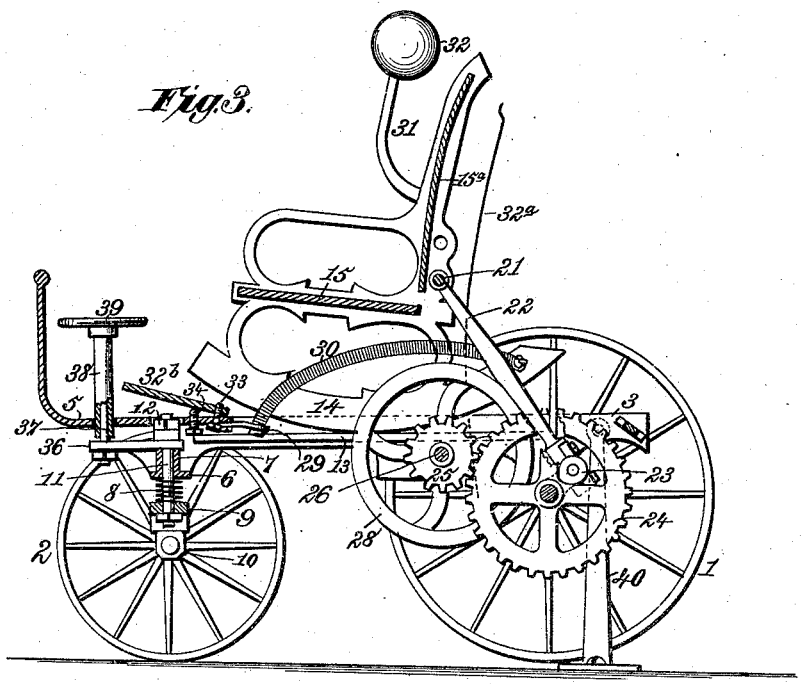
Fig. 3.
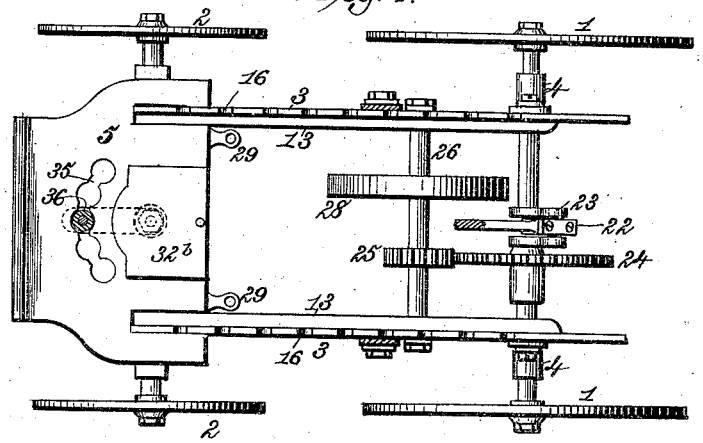
Fig. 4.
Fig. 5.
Witnesses. Inventor:
Robert Everett. Hippolyte Schneider.
J. A. Rutherford. By James L. Norris,
Atty.

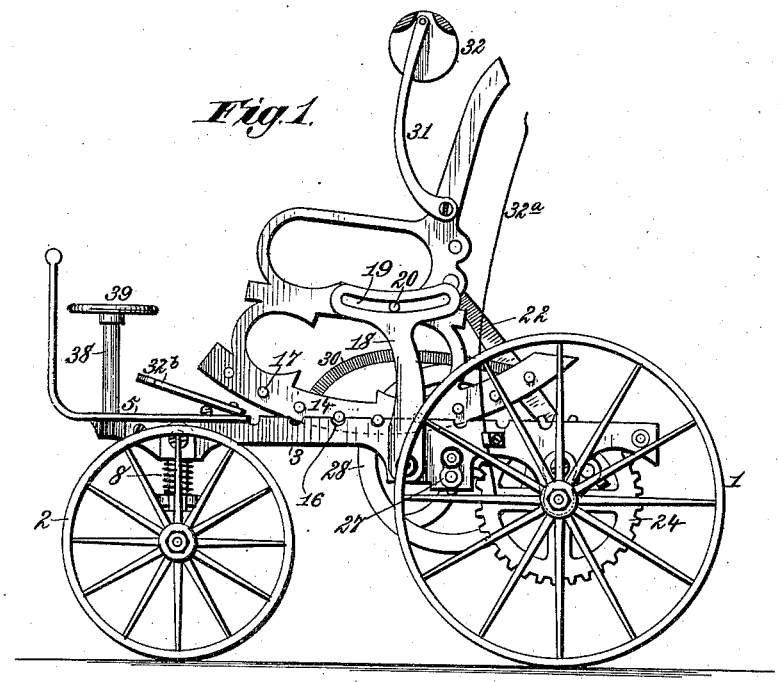

UNITED STATES PATENT OFFICE.

HIPPOLYTE SCHNEIDER, OF PITTSBURG, PENNSYLVANIA.

VELOCIPEDE.

SPECIFICATION forming part of Letters Patent No. 319,329, dated June 2, 1885.

Application filed April 24, 1885. (No model.)

*To all whom it may concern:*

Be it known that I, HIPPOLYTE SCHNEIDER, a citizen of the United States, residing at Pittsburg, in the county of Allegheny and State of Pennsylvania, have invented new and useful Improvements in Motive Powers and Wheeled Vehicles, of which the following is a specification.

This invention has for its object to provide novel mechanism for propelling a wheeled vehicle; to provide novel means for driving light machinery, such as a lathe; to provide novel devices for steering a wheeled vehicle and holding the axle of the steering-wheels in the position to which it may be adjusted for traveling in straight or curved lines, and to provide an adjustable foot-support for the rider or operator.

The objects of my invention I accomplish in the manner and by the combination of devices hereinafter described and claimed, reference being made to the accompanying drawings, in which—

Figure 1 is a side elevation of a wheeled vehicle embodying my invention; Fig. 2, a front elevation of the same; Fig. 3, a longitudinal central sectional view; Fig. 4, a plan view with the rocking seat omitted; Fig. 5, a detail transverse sectional view of the supporting-frame, and Fig. 6 a detail side elevation showing a modification of the invention.

In order to enable those skilled in the art to make and use my invention, I will now describe the same in detail, reference being made to the drawings, where the numerals 1 and 2 indicate, respectively, the rear and front axles, each provided with two wheels to travel upon the surface to be traversed.

The supporting-frame is composed of two side bars, 3, having their rear end portions provided with sleeves or boxes 4, in which the rear axle revolves, the front end portions of the bars supporting a horizontal platform, 5, and connected by a cross-bar, 6, having an attached vertical sleeve, 7, and yieldingly supported by a spring, 8, which rests centrally upon an arched bar, 9, the ends of which are provided with sleeves or boxes 10, in which the front axle revolves. A king-bolt, 11, passes through the arched bar, the cross-bar 6, and its sleeve 7, the upper end of the king-bolt being secured by a nut, 12, adapted to an orifice in the platform 5, whereby the latter, with the forward ends of the side bars, 3, can yieldingly rise and fall to a limited extent. The inner side of each side bar, 3, is provided with a laterally-projecting horizontal flange, 13, serving as a base for supporting the rockers 14 of a seat, 15, which seat may be of any suitable construction, and, if desired, be provided with a back, 15ª, and arms, as in ordinary rocking-chairs. The upper edge of each side rail is provided with a series of semicircular notches or recesses, 16, and each rocker is furnished with a series of attached laterally-projecting pins or studs, 17, adapted to engage the notches or recesses in such manner that when the seat is rocking one of the pins on each rocker engages one of the notches or recesses in each rail, for the purpose of preventing any sliding or longitudinal movement of the rockers on their supporting-flanges. A standard, 18, is rigidly attached to each side rail, and at their upper ends are provided with heads having segmental slots 19, in which move pins 20, rigidly attached to the seat, for steadying, guiding, and limiting the movement of the latter. The rockers are prevented from lateral movement on their supporting-flanges by those portions of the side rails which rise above the flanges. To the rear of the seat is secured a cross-rod, 21, passing loosely through a sleeve at the upper end of a pitman, 22, the other end of which is sleeved upon a cranked portion, 23, of the rear axle, 1, and adjacent to such crank the axle is provided with a rigidly-attached gear-wheel, 24, which meshes into a pinion, 25, rigidly mounted on a counter-shaft, 26, arranged in front of the rear axle and journaled in pendent bearings 27, carried by the side rails, said counter-shaft being provided with a balance-wheel, 28, which also serves as a power-transmitting pulley, as hereinafter explained. The rear end of the platform 5, at each side, is provided with projecting arms or brackets 29, to which are attached one end of two coiled springs, 30, the other ends of which are connected with the rear ends of the rockers, the object being to assist in throwing the seat forward in its rocking movements, and also to aid in the movements required to cause the pitman to pass the dead-center. For the purpose of contributing to the accomplishment of these results, I provide the seat-back 15ª with two upwardly-projecting arms, 31, carrying pivoted swinging weights 32 at their upper ends, so that their momentum materially aids in moving the seat and causing the pitman to pass the dead-center. The weighted arms effect such leverage as enables the operator to operate the rocking-chair, and thereby operate the driving mechanism with comparatively little exertion. To the supporting-frame are secured the lower ends of stiff spring wires or plates 32ª, the upper free ends of which are arranged in the path of the weighted arms 31 in such manner that by the rearward movement of the seat the weighted arms are caused to act upon and press the free ends of the wires or plates in a rearward direction, so that their reaction in restoring themselves to their normal position effects considerable pressure on the weighted arms and tends to throw the seat forward, thus relieving the operator.

In order to vary the leverage of the weighted arms, I provide the back 15ª with vertical slots, in which the lower ends of the weighted arms are adjustably secured by screw-nuts, or otherwise, (see Fig. 6,) so that such arms can be raised or lowered relatively to the seat. I may also provide the upper ends of the arms 31 with a series of perforations, so that the pivots of the swinging weights can be changed from one perforation to another, thereby adjusting the position of the weights on the arms, for increasing or decreasing the leverage action of the weighted arms on the rocking seat. The platform 5 is provided with a foot-rest, 32ᵇ, held at its rear edge by a set-screw, 33, and between the latter and the front edge of the foot-rest the platform is provided with two set-screws, 34, bearing against the under side of the foot-rest in such manner that by adjusting these screws in the platform the inclination and position of the foot-rest can be changed to accommodate the rider or operator who sits on the seat. The forward end of the platform is provided with a segmental slot, 35, having circular recesses in its opposite edges, and to the king-bolt 11 is secured one end of a lever, 36, having at its forward end a vertical pin, 37, projecting upward through the slot. A sliding cylindrical tube, 38, is arranged on this pin, and at its upper end carries a suitable handle, 39, by which to manipulate it. The tube correctly engages the circular recesses in the edge of the slot, and when in such engagement the axle of the steering-wheels is held in its adjusted position. By raising the tube from the circular recesses the lever 36 can be moved either to the right or left, thereby turning the king-bolt, and with it the arched bar in which the front axle is journaled or supported, thereby enabling the position of the axle to be changed for traveling either in straight or curved lines, as desired. If a circle is to be traversed, the axle can be held in the required position by engaging the sliding tube with the circular recesses at one end or the other of the slot, while if it is desired to traverse a straight course the tube is engaged with the intermediate recesses. By rocking the seat motion is imparted to the cranked rear axle, and through the gear-wheel and pinion the counter-shaft is revolved, the balance-wheel serving to steady the running of the parts and imparting momentum to enable the rocking seat to actuate the cranked axle.

If it is desired to use the invention as a motive power for driving lathes, churns, or other light machines, the rear wheels are raised from the ground and the balance-wheel, which is also a pulley, is belted to the lathe or other apparatus to be operated.

For the purpose of lifting the rear wheels and supporting the vehicle in a stationary position, I provide each side rail at its rear end with a pivoted detachable leg, 40, having a flanged foot, perforated for the passage of screws or bolts for rigidly attaching the same to a rigid foundation or support. The lifting and supporting legs are pivoted in order to permit the vibrations of the supporting-frame, which necessarily follow where the latter is secured in a fixed position to serve as a power-transmitter.

I thus provide what may be termed a "combined traveling vehicle and power-transmitting motor," which can be used for pleasure-riding, racing, and other like purposes, and also for driving light machinery and other apparatus.

Having thus described my invention, what I claim is—

1. The combination of the front and rear wheeled axles, the latter having a crank, side rails supported by the axle, a rocking seat on the side rails, a pitman connecting the seat with the cranked axle, a gear-wheel on the latter, and a counter-shaft journaled on the side rails and having a balance-wheel, and a pinion engaging the gear-wheel, substantially as described.

2. The combination of the front and rear axles, the latter having a crank and a gear-wheel, the side rails having sleeves in which the rear axle revolves, a counter-shaft journaled on the side rails in front of the rear axle, and provided with a pinion and a combined balance-wheel and pulley, a rocking seat having pins to engage the side rails, and a pitman directly connecting the seat and the crank of the rear axle, substantially as described.

3. The combination, with side rails having a series of notches or recesses and lateral horizontal flanges, of a seat having rockers, each having a series of pins or studs to alternately engage the notches or recesses, and gearing for revolving the axle by the rocking of the seat, substantially as described.

4. The combination of the front and rear axles, the latter having a crank and a gear-wheel, the side rails supported by the axles, and the counter-shaft journaled on the side rails and having a pinion and balance-wheel, with the rocking seat supported by the rails, the cross-rod secured to the rear of the seat, and the pitman sleeved upon said rod and to the crank of the rear axle, substantially as described.

5. The combination of the side rails having a series of notches or recesses and lateral horizontal flanges, the seat resting on the flanges and having rockers, each provided with a series of pins or studs for alternately engaging the notches or recesses, the upright arms secured to the side and having heads provided with segmental slots engaging pins on the seat, and gearing connecting the seat with the axle, substantially as described.

6. The combination of the front and rear axles, the latter having a crank and a gear-wheel, the side rails supported by the axles, and each having a series of notches and a lateral flange, a counter-shaft journaled on the side rails and having a pinion and a balance-wheel, a seat having rockers resting on the flanges, and each provided with a series of pins or studs to engage the notches or recesses, and a pitman connecting the seat with the crank of the rear axle, substantially as de-described.

7. The combination of the front and rear axles, the side rails supported thereby, the seat having rockers supported by the rails, the front platform on the rails, the springs connected at one end with the side rails and at the other end with the rear portions of the rockers, and gearing connecting the seat with the rear axle, substantially as described.

8. The combination of the front and rear axles, the side rails supported thereby, the seat having rockers supported by the rails, the front platform on the rails having brackets at its rear end, the springs secured at one end to the brackets and at the other end to the rear portion of the rockers, and gearing connecting the seat with the rear axle, substantially as described.

9. The combination of the front and rear axles, the side rails supported thereby, the rocking seat, the vertical arms secured to the seat, and provided at their upper ends with pivoted weights, and gearing connecting the seat with the rear axle, substantially as described.

10. The combination of the front and rear axles, the side rails connected at their front by a cross-bar, and having a platform provided with a segmental slot having recesses in its edges, the bar supported by the front axle, the king-bolt passing through the said bars, the lever secured to the king-bolt, and having a pin projecting through the slot in the platform, and the sliding tube on the pin for engaging the recesses in the edges of the slot, substantially as described.

11. The combination, with the rocking seat and the side rails having a platform at their front, of the foot-rest, the set-screw attaching the latter to the platform, and the set-screws acting on the foot-rest between its front edge and the said attaching-screw, substantially as described.

12. The combination, with the wheeled frame, driving mechanism, and balance-wheel pulley, of legs secured to the frame for lifting the rear wheels from the ground and holding the frame, substantially as described.

13. The combination, with the supporting-frame, of the rocking seat provided with weighted arms, and the spring wires or plates rising from the frame in the path of the weighted arms, substantially as described.

In testimony whereof I affix my signature in presence of two witnesses.

HIPPOLYTE SCHNEIDER.

Witnesses:
STEUART SIMPSON,
JOHN H. WEBSTER.